United States Patent
Horisaki

(10) Patent No.: US 7,701,918 B2
(45) Date of Patent: Apr. 20, 2010

(54) METHOD AND DEVICE FOR FREQUENCY ADJUSTMENT

(75) Inventor: Koji Horisaki, Yokohama (JP)

(73) Assignee: Kabushiki Kaisha Toshiba, Tokyo (JP)

(*) Notice: Subject to any disclaimer, the term of this patent is extended or adjusted under 35 U.S.C. 154(b) by 1741 days.

(21) Appl. No.: 10/798,351

(22) Filed: Mar. 12, 2004

(65) Prior Publication Data

US 2005/0152403 A1     Jul. 14, 2005

(30) Foreign Application Priority Data

Dec. 25, 2003    (JP)    ............... 2003-431449

(51) Int. Cl.
*H04J 1/00*    (2006.01)
*H04L 27/06*    (2006.01)

(52) U.S. Cl. .................. 370/343; 370/480; 375/344

(58) Field of Classification Search ......... 370/343–344, 370/480; 375/344
See application file for complete search history.

(56) References Cited

U.S. PATENT DOCUMENTS

| | | | | |
|---|---|---|---|---|
| 6,041,085 A | * | 3/2000 | Anzai | ...................... 375/326 |
| 6,134,286 A | | 10/2000 | Chennakeshu et al. | |
| 2005/0078774 A1 | * | 4/2005 | Rick et al. | .................. 375/344 |

FOREIGN PATENT DOCUMENTS

| | | |
|---|---|---|
| JP | 2001-45082 | 2/2001 |
| JP | 2001-177436 | 6/2001 |

* cited by examiner

*Primary Examiner*—Kevin C Harper
(74) *Attorney, Agent, or Firm*—Oblon, Spivak, McClelland, Maier & Neustadt, L.L.P.

(57) ABSTRACT

The frequency deviation of a first signal having a short cycle time contained in a received signal is detected and the frequency deviation of a second signal having a long cycle time contained in the received signal is also detected. Then, the frequency deviation of the received signal is determined on the basis of the detected frequency deviation of the first signal and the second signal. Subsequently, the frequency of the received signal is adjusted.

9 Claims, 7 Drawing Sheets

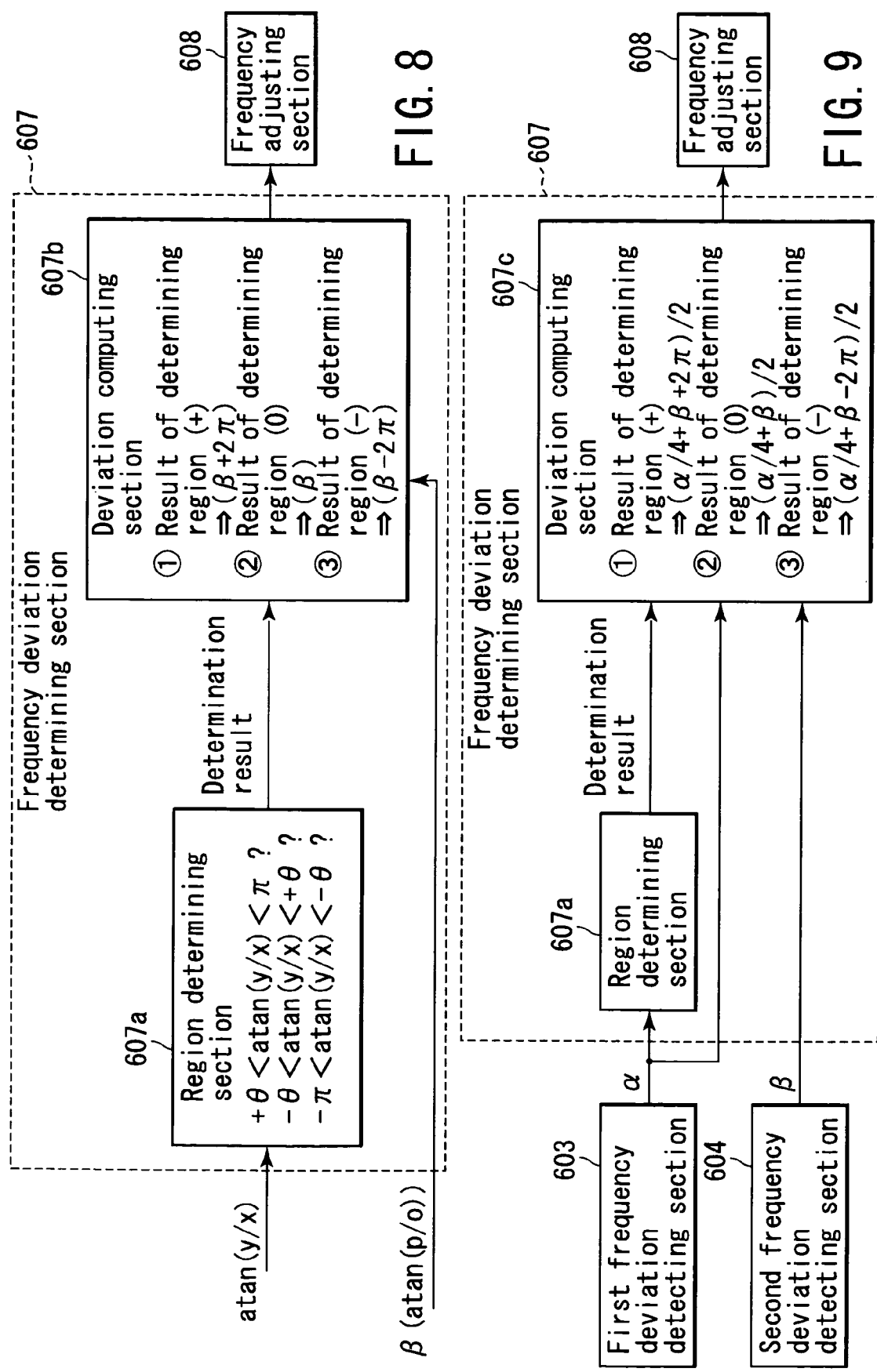

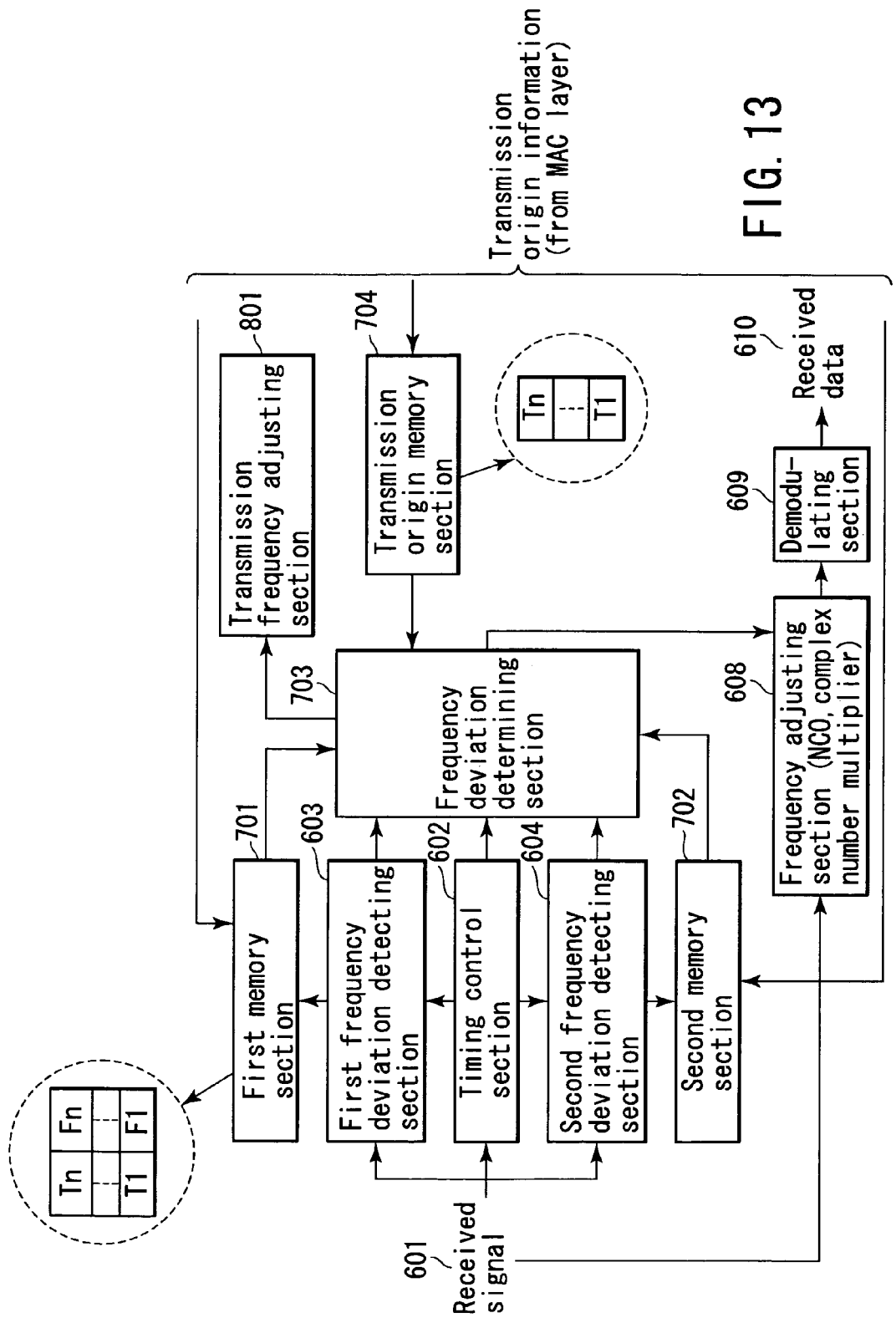

METHOD AND DEVICE FOR FREQUENCY ADJUSTMENT

CROSS-REFERENCE TO RELATED APPLICATIONS

This application is based upon and claims the benefit of priority from prior Japanese Patent Application No. 2003-431449, filed Dec. 25, 2003, the entire contents of which are incorporated herein by reference.

BACKGROUND OF THE INVENTION

1. Field of the Invention

This invention relates to a frequency adjustment method and a frequency adjustment device which can suitably be used for a communication system, such as a wireless LAN which requires high speed frequency synchronization.

2. Description of the Related Art

For communication systems adapted to transmit information by modulating the carrier wave, the transmitter and the receiver are required to make their respective carrier wave frequencies coincide with each other. Generally, however, it is difficult for the transmitter and the receiver to keep their carrier wave frequencies accurately agreeing with each other. For this reason, a carrier wave adjustment operation is conducted at the receiver before it starts for an operation of communication.

Recently, wireless LANs have been put to practical use to allow personal computers to wirelessly communicate with each other and free them from positional restrictions imposed on them for operation. The wireless LAN typically uses a modulation method which is referred to as OFDM (orthogonal frequency division multiplexing), which requires high speed frequency synchronization. With OFDM, a receiver which receives a signal from a transmitter needs to synchronize its carrier wave frequency with which of the received signal at high speed. Generally, a method of coarsely adjusting the reception frequency of the receiver and then finely adjusting it is used for the purpose of frequency synchronization (see, Japanese Patent laid open (KOKAI) No. 2001-177436).

The above-described method of coarsely adjusting the reception frequency and then finely adjusting it in order to make it coincide with the target frequency is advantageous from the viewpoint of range and accuracy of adjustment. On the other hand, the method requires a relatively long period of time for frequency adjustment because the deviation of the reception frequency has to be gauged after the completion of the coarse adjustment operation and a fine adjustment operation has to be performed on the basis of the gauged deviation. The system such as wireless LAN (IEEE 802.11a) needs to complete automatic frequency control (AFC) for a short time. Thus, the time which AFC requires needs to be made as short as possible.

In order to quickly complete both the coarse adjustment operation and the fine adjustment operation, it is necessary to start the former operation immediately after the signal reception. However, the signals arranged at the top of a packet in a region referred to as preamble which is to be transmitted before transmitting data signals are apt to be subjected to frequency fluctuations due to noise and therefore it has been difficult to accurately detect the amount of the gap between the frequency of the received signal and which of the corresponding frequency of the receiver. Thus, there is a demand for a method and a device for frequency adjustment which can effectively suppress the influence of noise and precisely and reliably carry out a frequency adjustment operation.

BRIEF SUMMARY OF THE INVENTION

According to a first aspect of the invention, there is provided a frequency adjustment method comprising: detecting a deviation of a frequency of a first signal contained in a received signal and having a short cycle time; detecting a deviation of a frequency of a second signal contained in the received signal and having a cycle time longer than that of the first signal; determining a deviation of a frequency of the received signal on the basis of the detected deviation of the first signal and that of the second signal; and adjusting the frequency of the received signal.

According to a second aspect of the invention, there is provided a frequency adjustment device comprising: a first detecting section which detects a deviation of a frequency of a first signal contained in a received signal and having a short cycle time; a second detecting section which detects a deviation of a frequency of a second signal contained in the received signal and having a cycle time longer than that of the first signal; a determining section which determines a deviation of a frequency of the received signal on the basis of the deviation of the first signal detected by the first detecting section and that of the second signal detected by the second detecting section; and a frequency adjusting section which adjusts a frequency of the received signal on the basis of the frequency deviation determined by the determining section.

According to a third aspect of the invention, there is provided a frequency adjustment device comprising: a first detecting section which detects a deviation of a frequency of a first signal contained in a received signal and having a short cycle time; a first memory section which stores a past frequency deviation of the first signal detected by the first detecting section; a second detecting section which detects a deviation of a frequency of a second signal contained in the received signal and having a cycle time longer than that of the first signal; a second memory section which stores a past frequency deviation of the second signal detected by the second detecting section; a determining section which determines a deviation of the frequency of the received signal on the basis of the frequency deviation of the first signal detected by the first detecting section, that of the second signal detected by the second detecting section, the past frequency deviations of the first past signals stored in the first memory section and the past frequency deviations of the second past signals stored in the second memory section; and a first frequency adjusting section which adjusts the frequency of the received signal on the basis of the frequency deviation determined by the determining section.

BRIEF DESCRIPTION OF THE SEVERAL VIEWS OF THE DRAWING

FIG. 8 is a schematic block diagram of part of the device of FIG. 6;

FIG. 9 is a schematic block diagram of part of an automatic frequency adjustment device which relates to the third embodiment;

FIG. 13 is a schematic block diagram of an automatic frequency adjustment device which relates to the fifth embodiment of the invention.

DETAILED DESCRIPTION OF THE INVENTION

The present invention will now be described by referring to the accompanying drawings which illustrate preferred embodiments of the invention.

1st Embodiment

The first embodiment of the invention is characterized in which it performs an operation which is equivalent to a coarse adjustment operation at the time when it performs a fine adjustment operation. In other words, it does not perform a fine adjustment operation on a signal which has been subjected to a coarse adjustment operation.

Figure 1:
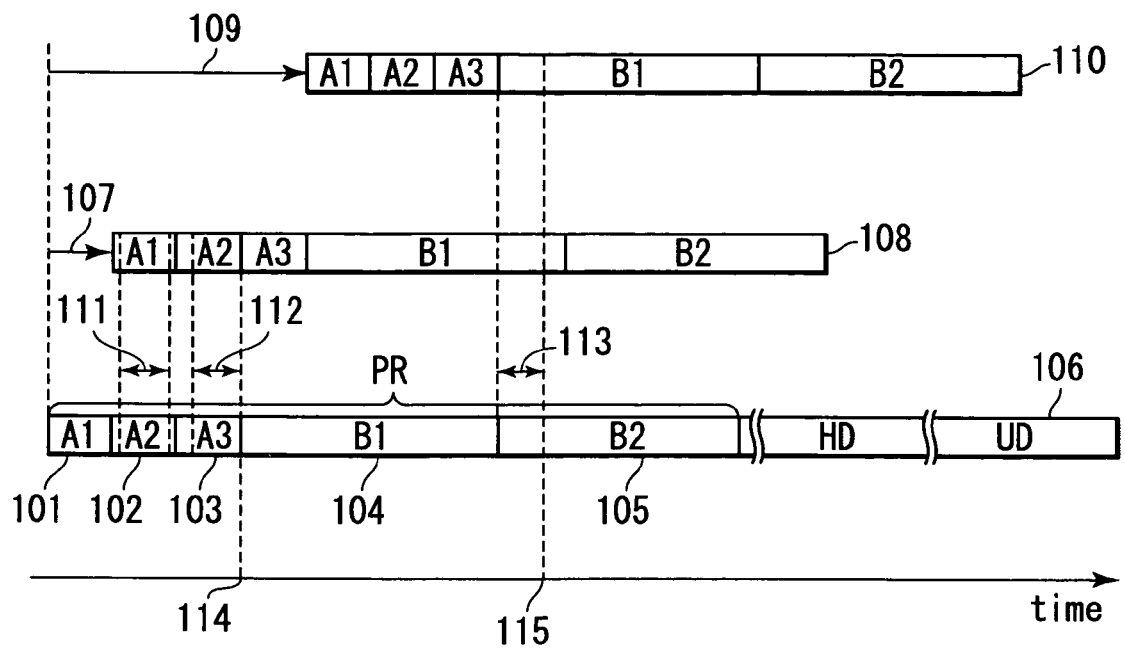
FIG. 1 is a schematic illustration of a first embodiment of the invention, showing an automatic frequency adjustment method.

FIG. 1 illustrates the first embodiment of automatic frequency adjustment method according to the invention. The automatic frequency adjustment method is transmitted prior to transmission of data signals so which both the transmitting side and the receiving side may perform a frequency adjustment operation, using a known preamble.

A received signal 106 in FIG. 1 has a frame structure that typically includes preamble PR, header HD that immediately follows the preamble and user data UD. The preamble PR typically includes signals A1 (101), A2 (102) and A3 (103) having a short cycle time (short cycle time signals) and signals B1 (104) and B2 (105) having a long cycle time (long cycle time signals). In the first embodiment, the short cycle time signals A1, A2 and A3 are identical with each other and have a cycle time of 800 ns (107), for example. The long cycle time signals B1 and B2 are identical with each other and have a cycle time of 3,200 ns (109), for example.

The preamble may have any configuration so long as it comprises a plurality of short cycle time signals and a plurality of long cycle time signals. Therefore, the preamble included in the frame structure of IEEE 802.11a or preamble having a similar configuration may be applied to the first embodiment.

Firstly, a method for detecting a frequency deviation using a short cycle time signal will be specifically described. A signal (108) is generated by delaying the received signal (106) by 800 ns (107) and the correlation of the received signal (106) and the delayed received signal (108) is computed. Assume here that the correlation (x+yj) of complex numbers (a+bj) and (c+dj) is defined as (a+bj)(c−dj) or (a−bj)(c+dj).

The delay of 800 ns (107) is equal to the cycle time of the short cycle time signals A1, A2 and A3. By paying attention to the correlation of the delay signal of A1 and the signal A2 as indicated by an interval (111), it will be found that the signal A1 and the signal A2 are identical signals. Therefore, if there is no influence of distortion such as frequency deviation and noise, their value is expected to be a real number. If only there is a frequency deviation, the phase (atan (y/x)) of the correlation (x+yj) that corresponds to the frequency deviation is obtained. In other words, the frequency deviation can be detected from the phase of the correlation. The correlation may be detected either by using the correlation of a single clock time or the value obtained by synthesizing the correlations of a plurality of clock times which are close to each other.

Now, a method of detecting a frequency deviation using a long cycle time signal will be specifically described. The receiver generates a signal (110) by delaying the received signal (106) by 3,200 ns (109) and computes the correlation of the received signal (106) and the delayed received signal (110). The delay of 3,200 ns (109) is equal to the cycle time of the long cycle time signals B1, B2. By paying attention to the correlation of the delay signal of B1 and the signal B2 as indicated by an interval (113), it will be found that the signal B1 and the signal B2 are identical signals and, therefore, if there is no influence of distortion such as frequency deviation and noise, their value is expected to be a real number. If only there is a frequency deviation, the phase (atan (y/x)) of the correlation (x+yj) that corresponds to the frequency deviation is obtained. In other words, the frequency deviation can be detected from the phase of the correlation. The correlation may be detected either by using the correlation of a single clock time or the value obtained by synthesizing the correlations of a plurality of clock times which are close to each other.

Then, the frequency of the received signal since clock time (115) or since a clock time after the clock time (115) is adjusted on the basis of the detection result of frequency deviation, using the short cycle time signals, and that of the detection of frequency deviation, using the long cycle time signals.

Generally, when the phase (atan (y/x)) is determined from the correlation (x+yj), it includes uncertainty which is expressed by integer times of $2\pi$ [rad]. Therefore, the frequency deviation can be detected by using the short cycle time signals A1, A2, A3 within a frequency range between −625 kHz (=1/800×10$^{-9}$/2) which gives rise to a turn of −$\pi$ in 800 ns and +625 kHz that gives rise to a turn of +$\pi$ in 800 ns. Alternatively, the frequency deviation can be detected by using the long cycle time signals B1, B2 within a frequency range between −156.25 kHz (=1/3,200×10$^{-9}$/2) that gives rise to a turn of −$\pi$ in 3,200 ns and +156.25 kHz that gives rise to a turn of +$\pi$ in 3,200 ns. In short, the detection of frequency deviation using the short cycle time signals A1, A2, A3 provides a wider detectable range than the detection of frequency deviation using the long cycle time signals B1, B2.

Meanwhile, errors can occur in the phase of the correlation due to the influence of noise and so on. For the detection of frequency deviation using the short cycle time signals A1, A2, A3, there will occur an error of 1[rad] that corresponds to a frequency error of approximately 100 kHz. On the other hand, for the detection of frequency deviation using the long cycle time signals B1, B2, there will occur an error of 1[rad] that corresponds to a frequency error of approximately 25 kHz. In other words, if the phase errors of the correlation are substantially equal to each other, the detection of frequency deviation using the long cycle time signals B1, B2 provides a smaller detection error than the detection of frequency deviation using the short cycle time signals A1, A2, A3.

In short, the detection of frequency deviation using the short cycle time signals A1, A2, A3 provides a wide detectable range, whereas the detection of frequency deviation using the long cycle time signals B1, B2 provides a high detection accuracy level.

According to the prior art, firstly the frequency deviation is detected by using short cycle time signals and a coarse frequency adjustment operation is conducted on the basis of the result of this detecting operation. Subsequently, the frequency deviation is detected by using long cycle time signals and a fine frequency adjustment operation is conducted on the basis of the result of this detecting operation. Thus, according to the prior art, when the frequency deviation is detected by using long cycle time signals in the interval (113) shown in FIG. 1, a coarse frequency adjustment operation has to be started at least by clock time (114) on the basis of the detection result of frequency deviation using short cycle time signals. In other words, the detection result of frequency deviation performed by using short cycle time signals has to be finalized by the clock time (114).

To the contrary, according to the first embodiment, it is only necessary to start the detection of frequency adjustment by using short cycle time signals at clock time (115) or at a clock time after the clock time (115) on the basis of the detection result of frequency deviation using short cycle time signals and which of the detection of frequency deviation using long cycle time signals. Therefore, the detection result of frequency deviation using short cycle time signals may be finalized after the clock time (114). In other words, according to the first embodiment, the detection of frequency deviation using long cycle time signals can be started without waiting the finalization of the detection result of frequency deviation using short cycle time signals. Therefore, the time necessary for determining the frequency deviation of the received signal can be reduced.

Furthermore, the first embodiment provides advantages including an increased extent of freedom for selecting the interval for the detection of frequency deviation using short cycle time signals and for designing the detection circuit for detecting a frequency deviation.

According to the first embodiment, it does not matter if the detection of frequency deviation using short cycle time signals comes before the detection of frequency deviation using long cycle time signals or vice versa. Thus, this embodiment provides additional advantages, including an increased degree of freedom for designing the preamble and the circuit of the receiver.

While the first embodiment is described above in terms of a preamble realized by using a combination of two types of signals having a cycle time of 800 ns and that of 3,200 ns, the embodiment is by no means limited thereto and can be used with a preamble realized by using a combination of three or more than three types of signals having respective cycle times.

2nd Embodiment

FIGS. 2, 3, 4 and 5 show methods of selecting a region indicating a range of frequency deviation. An instance where the frequency deviation is detected by using short cycle time signals from the phase of the correlation of received signal (106) and delayed received signal (108) obtained by delaying the former signal by 800 ns in the interval (112) shown in FIG. 1 will be described below.

Figure 2:
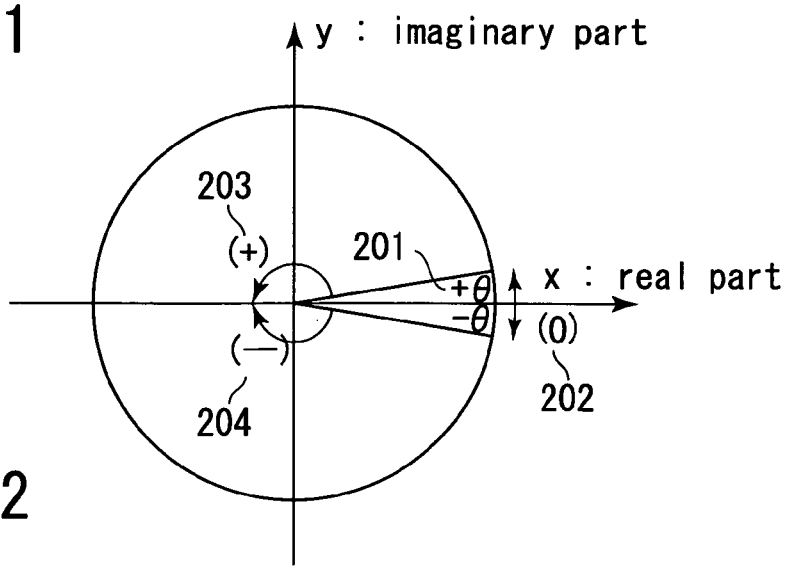
FIG. 2 is a schematic illustration of a second embodiment of the invention, showing how a region is determined.

Referring to FIG. 2, θ (201) is a predetermined phase threshold value. Region (0)(202) is selected when the phase of the correlation is not smaller than −θ and not greater than +θ. Region (+)(203) is selected when the phase of the correlation is greater than +θ and smaller than +π, while region (−) (204) is selected when the phase of the correlation is not smaller than −π and smaller than −θ.

Now, an instance where the frequency deviation is detected by using long cycle time signals from the phase of the correlation of received signal (106) and delayed received signal (110) obtained by delaying the former signal by 3,200 ns in the interval (113) shown in FIG. 1 will be described below.

Figure 3:
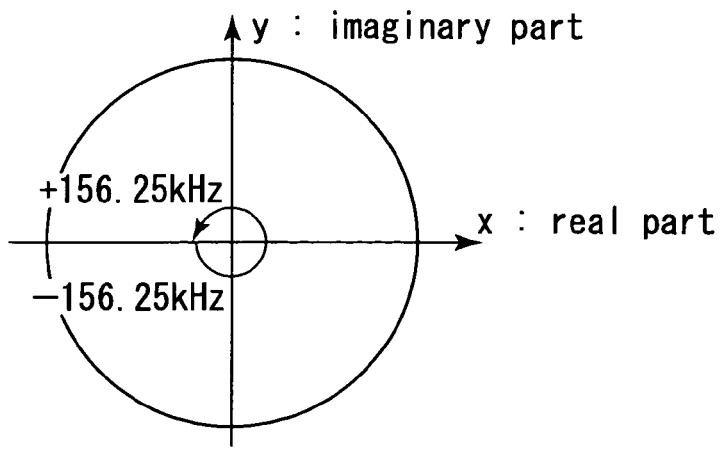
FIG. 3 is a schematic illustration of the second embodiment of FIG. 2, showing a range of frequency deviation.

If region (0)(202) shown in FIG. 2 is selected as a result of a region determining operation conducted on the basis of the above-described detection of frequency deviation using short cycle time signal, the frequency deviation is determined within the range between −156.25 kHz and +156.25 kHz as shown in FIG. 3 from the phase of the correlation obtained by the detection of frequency deviation using long cycle time signals.

Figure 4:
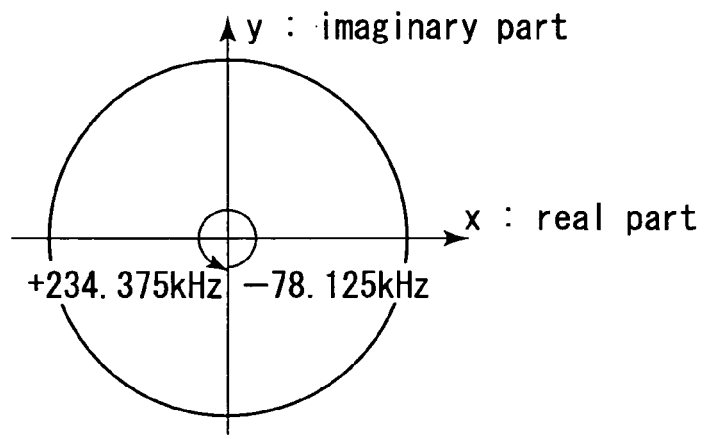
FIG. 4 is a schematic illustration of the second embodiment of FIG. 2, showing a range of frequency deviation.

Similarly, if region (+)(203) shown in FIG. 2 is selected as a result of a region determining operation conducted on the basis of the above-described detection of frequency deviation using a short cycle time signal, the frequency deviation is determined within the range between −78.125 kHz and +234.375 kHz as shown in FIG. 4 from the phase of the correlation obtained by the detection of frequency deviation using long cycle time signals.

Figure 5:
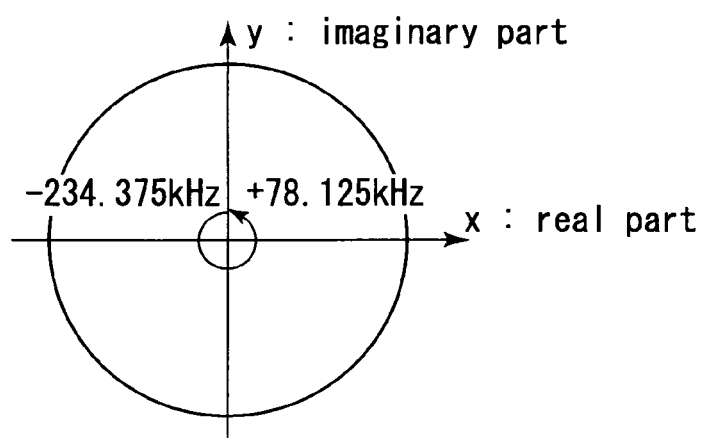
FIG. 5 is a schematic illustration of the second embodiment of FIG. 2, also showing a range of frequency deviation.

Furthermore, if region (−)(204) shown in FIG. 2 is selected as a result of a region determining operation conducted on the basis of the above-described detection of frequency deviation using a short cycle time signal, the frequency deviation is determined within the range between −234.375 kHz and +78.125 kHz as shown in FIG. 5 from the phase of the correlation obtained by the detection of frequency deviation using long cycle time signals.

It needs to be emphasized here that the detection result of frequency deviation using short cycle time signals is required not at the time when the correlation of frequency deviation is computed by using long cycle time signals but at the time when the frequency deviation of the received signal is determined.

According to the second embodiment, the detection of frequency deviation using short cycle time signals is used only for determining a region that requires just a low level of accuracy. In other words, the level of detection accuracy that is required for the detection of frequency deviation using short cycle time signals is limited. Thus, it is possible to reduce the circuit size and realize a receiver having a simple circuit configuration.

Figure 6:
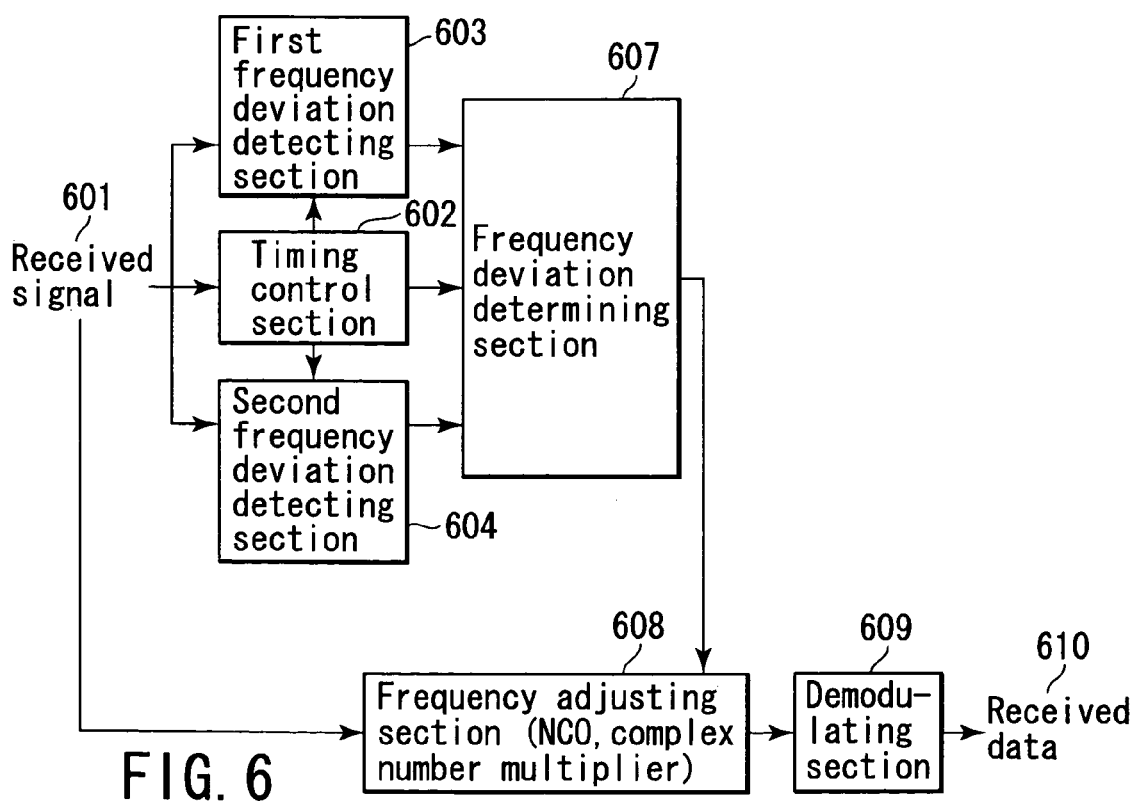
FIG. 6 is a schematic block diagram of an automatic frequency adjustment device which relates to the first and second embodiments of the invention.

FIG. 6 is a schematic block diagram of an automatic frequency adjustment device that can be used for the method of the first and second embodiments of the invention. Referring to FIG. 6, received signal 601 is in fact a signal obtained by way of conversion to an intermediate frequency signal and analog/digital conversion of the signal received at the antenna. The received signal is then supplied to a timing control section 602, a first frequency deviation detecting section 603 and a second deviation detecting section 604. The timing control section 602 generates timing signals including those for extracting short cycle time signals, those for extracting long cycle time signals and those for controlling the operations of various component sections, the timing signals of which are included in the preamble. The first frequency deviation detecting section 603 detects the frequency deviation of short cycle time signals. The second frequency deviation detecting section 604 detects the frequency deviation of long cycle time signals. A frequency deviation determining section 607 detects the frequency deviation of the received signal from the output signals of the first and second frequency deviation detecting sections 603, 604. The output signal of the frequency deviation determining section 607 is supplied to a frequency adjusting section 608 with the received signal. The frequency adjusting section 608 typically includes an NCO (numerically controlled oscillator) and a complex number multiplier and is adapted to adjust the frequency of the received signal according to the deviation value supplied from the frequency deviation determining section 607. The output signal of the frequency adjusting section 608 is supplied to a demodulating section 609 so that the received data 610 which include headers and user data are demodulated in the demodulating section 609. The received data 610 are then supplied to a medium access control (MAC) layer (not shown).

Figure 7A:
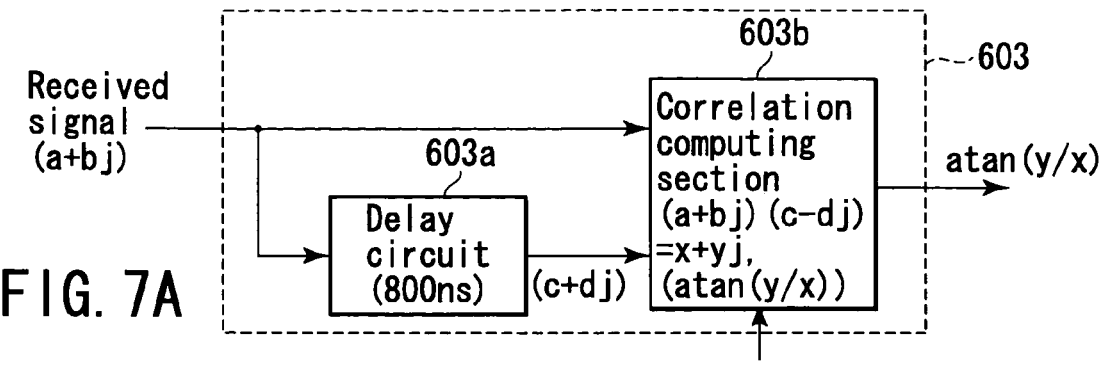
FIGS. 7A and 7B are schematic block diagrams of part of the device of FIG. 6.

FIG. 7A shows an exemplary first frequency deviation detecting section 603. The first frequency deviation detecting section 603 comprises a delay circuit 603a and a correlation computing section 603b. The delay circuit 603a delays received signal (a+bj) by 800 ns, for example. The delayed received signal (c+dj) and the received signal (a+bj) are supplied to the correlation computing section 603b. The correlation computing section 603b typically comprises a phase comparator and a multiplier and determines, for instance, correlation (x+yj) by computing (a+bj)(c−dj) and outputs the phase (atan (y/x)) of the correlation.

Figure 7B:
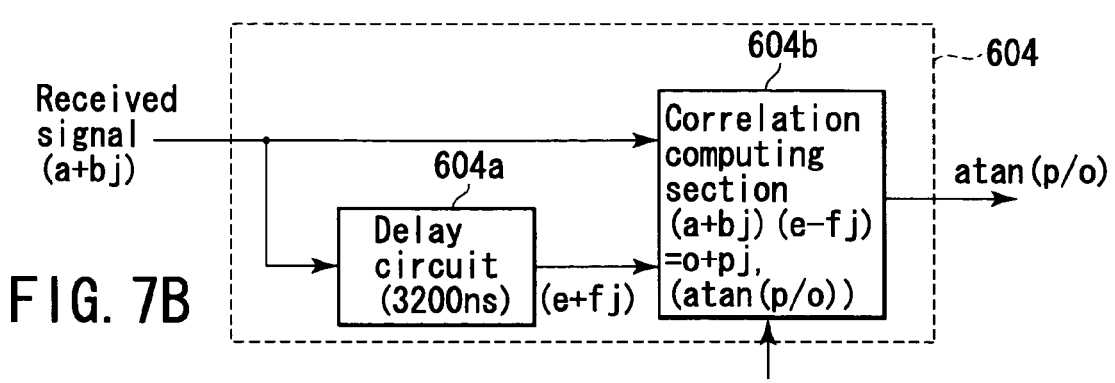

FIG. 7B shows an exemplary second frequency deviation detecting section 604. The second frequency deviation detecting section 604 comprises a delay circuit 604a and a correlation computing section 604b. The delay circuit 604a delays received signal (a+bj) by 3,200 ns, for example. The delayed received signal (e+fj) and the received signal (a+bj) are supplied to the correlation computing section 604b. The correlation computing section 604b typically comprises a phase comparator and determines, for instance, correlation (o+pj) by computing (a+bj)(e−fj) and outputs the phase (atan (p/o)) of the correlation.

FIG. 8 shows an exemplary frequency deviation determining section 607. The frequency deviation determining section 607 comprises a region determining section 607a and a deviation computing section 607b. The region determining section 607a determines the region of deviation as shown in FIG. 2 from the phase of the correlation supplied from the first frequency deviation detecting section 603. More specifically, the region determining section 607a determines that one of the regions of $+\theta \leq$ atan $(y/x) < \pi$, $-\theta \leq$ atan $(y/x) < +\theta$ and $-\pi \leq$ atan $(y/x) < -\theta$ in which the phase (atan (y/x)) of the correlation is contained. The result of determination output from the region determining section 607a is supplied to the deviation computing section 607b along with the phase β supplied from the second frequency deviation detecting section 604. The deviation computing section 607b determines the frequency deviation of the received signal from the correlation supplied from the second frequency deviation detecting section 604 according to the result of determination as supplied from the region determining section 607a. More specifically, it determines the deviation to be equal to $(\beta+2\pi)$ when the result of determination is (+) but to be equal to (β) when the result of determination is (0), whereas it determines the deviation to be equal to $(\beta-2\pi)$ when the result of determination is (−).

With the automatic frequency adjustment device shown in FIGS. 6 through 8, the detection result of frequency deviation using short cycle time signals is required not at the time when the correlation of frequency deviation is computed by using long cycle time signals but at the time when the frequency deviation of the received signal is determined. Therefore, the first frequency deviation detecting section 603 and the region determining section 607a are allowed to have a wide margin for circuit design because they are not required to operate at high speed.

Additionally, the region determining section 607a determines only the region to which the correlation belongs, an operation for which only a low level of accuracy is required. Therefore, the region determining section 607a may have a simple circuit configuration and comprise only a comparator.

With a frequency adjustment method of the prior art with which a coarse adjustment operation and a fine adjustment operation are conducted serially requires the coarsely adjusted signal and finely adjusted signal to be multiplied by some other differential signal. Thus, the frequency adjusting section needs to comprise two NCOs in order to generate two different signals or, if it comprises only a single NCO, it needs to generate signals of two different types, in which case the frequency adjusting section is required to have a complex circuit configuration. On the contrary, a fine adjustment operation and a coarse adjustment operation are conducted simultaneously in the second embodiment so that it is only necessary to generate signals of a single type by means of a single NCO. Thus, the second embodiment provides an advantage of simplicity in terms of NCO.

3rd Embodiment

The third embodiment of the invention will now be described. The third embodiment differs from the second embodiment in terms of the method for determining the frequency deviation of the received signal. However, the method of determining the region of frequency deviation using short cycle time signals of this embodiment is the same as that of the second embodiment and hence will not be described any further.

Assume here which the frequency deviation is detected by using long cycle time signals from the phase of the correlation of received signal (106) and delayed received signal (110) that is delayed from the received signal by 3,200 ns in the interval (113) shown in FIG. 1. If region (0)(202) as shown in FIG. 2 is selected as a result of determining the region by detecting a frequency deviation using short cycle time signals as described above, the average of the phase of the correlation as determined by detecting the frequency deviation using long cycle time signals, and ¼ of the phase of the correlation as determined by detecting a frequency deviation using short cycle time signals is calculated. Based on the calculated average, the frequency deviation is determined within a range between −156.25 kHz and +156.25 kHz as shown in FIG. 3.

Similarly, if region (+)(203) as shown in FIG. 2 is selected as a result of determining the region, the average of the phase of the correlation as determined by detecting the frequency deviation using long cycle time signals, and ¼ of the phase of the correlation as determined by detecting a frequency deviation using short cycle time signals is calculated. Based on the calculated average, the frequency deviation is determined within a range between −78.125 kHz and +234.375 kHz as shown in FIG. 4.

Furthermore, if regions (−) and (204) are selected as a result of determining the region, the average of the phase of the correlation as determined by detecting the frequency deviation using long cycle time signals, and ¼ of the phase of the correlation as determined by detecting a frequency deviation using short cycle time signals is calculated. Based on the calculated average, the frequency deviation is determined within a range between −234.375 kHz and +78.125 kHz as shown in FIG. 5.

In the third embodiment, as in the first and second embodiments, the detection result of frequency deviation using short cycle time signals is required not at the time when the correlation of frequency deviation is computed by using long cycle time signals but at the time when the frequency deviation of the received signal is determined.

In the third embodiment, the detection result of frequency deviation using short cycle time signals and that of detection of frequency deviation using long cycle time signals are synthetically combined and the frequency deviation of the received signal is determined from the outcome of the synthesis. As a result, the influence of noise can be minimized. In other words, an automatic frequency adjustment method that is not influenced by noise is provided.

FIG. 9 is a schematic block diagram of an automatic frequency adjustment device that can be used for the method of the third embodiment of the invention. Note that FIG. 9 is a part of the block diagram of FIG. 6. In FIG. 9, the frequency deviation determining section 607 comprises a region determining section 607a and a deviation computing section 607c. The deviation computing section 607c receives the phase (α) of the correlation supplied from the first frequency deviation detecting section 603 and the result of determination output from the region determining section 607a. Additionally, the deviation computing section 607c receives the phase (β) of the correlation output from the second frequency deviation detecting section 604.

The deviation computing section 607c computes the average value as shown below depending on the result of determining the region and determines the frequency deviation of the received signal. It computes $(\alpha/4+\beta+2\pi)/2$ if the outcome of determining the region is (+) but $(\alpha/4+\beta)/2$ if the outcome of determining the region is (0), whereas it computes $(\alpha/4+\beta-2\pi)/2$ if the outcome of determining the region is (−). The frequency deviation output from the frequency deviation determining section 607 is supplied to the frequency adjusting section 608.

According to the third embodiment, the deviation computing section 607c determines the average of the phase α of the correlation supplied from the first frequency deviation detecting section 603 and the phase β of the correlation supplied from the second frequency deviation detecting section 604. Thus, the influence of the noise contained at the top of a packet can be suppressed and hence the deviation of a received signal can be determined accurately. Therefore, the frequency of the received signal can be adjusted accurately.

A technique of determining the average of ¼ of the phase α of the correlation obtained by detecting the frequency deviation, using short cycle time signals, and the phase β of the correlation obtained by detecting the frequency deviation, using long cycle time signals, is employed in the third embodiment. However, this embodiment is by no means limited thereto and the correlations or the frequency deviations may be synthetically combined. Still further, the phases of the correlations may be weighted and synthetically combined in place of using the average value.

4th Embodiment

Figure 10:
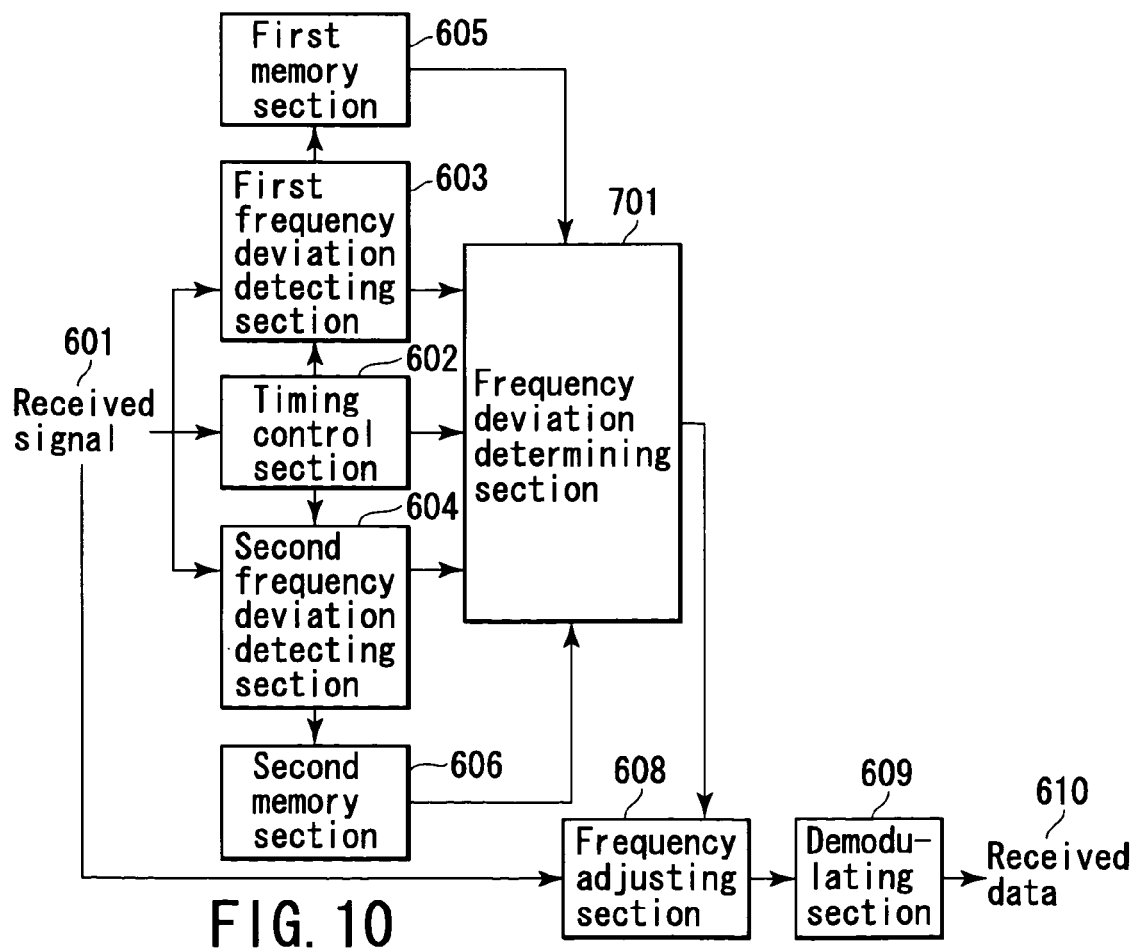
FIG. 10 is a schematic block diagram of a fourth embodiment of the invention.

FIG. 10 is a schematic block diagram of the fourth embodiment of the invention. In FIG. 10, the components which are same as those of FIG. 6 are denoted respectively by the same reference symbols. In the fourth embodiment, the frequency deviation determining section 701 determines the frequency deviation on the basis of information on the current frame and information on the past frames.

Referring to FIG. 10, a first memory section 605 is connected to the first frequency deviation detecting section 603 and the frequency deviation determining section 701. The first memory section 605 typically stores information on the phase of the correlation detected by the first frequency deviation detecting section 603 for each frame. A second memory section 606 is connected to the second frequency deviation detecting section 604 and the frequency deviation determining section 701. The second memory section 606 typically stores information on the phase of the correlation as detected by the second frequency deviation detecting section 604 for each frame.

The frequency deviation determining section 701 synthetically combines the information on the frequency deviations in the past which have been detected by using short cycle time signals of the received signals as stored in the first memory section 605 and the information on the frequency deviation supplied from the first frequency deviation detecting section 603 and detected by using short cycle time signals of the currently received signal, the pieces of information on the frequency deviations in the past which have been detected by using long cycle time signals of the received signals as stored in the second memory section 606, the information on the frequency deviation supplied from the first frequency deviation detecting section 603 and detected by using long cycle time signals of the currently received signal. Then, the frequency deviation is determined for the purpose of frequency adjustment for the currently received signal on the basis of the outcome of the synthesis.

Figure 11:
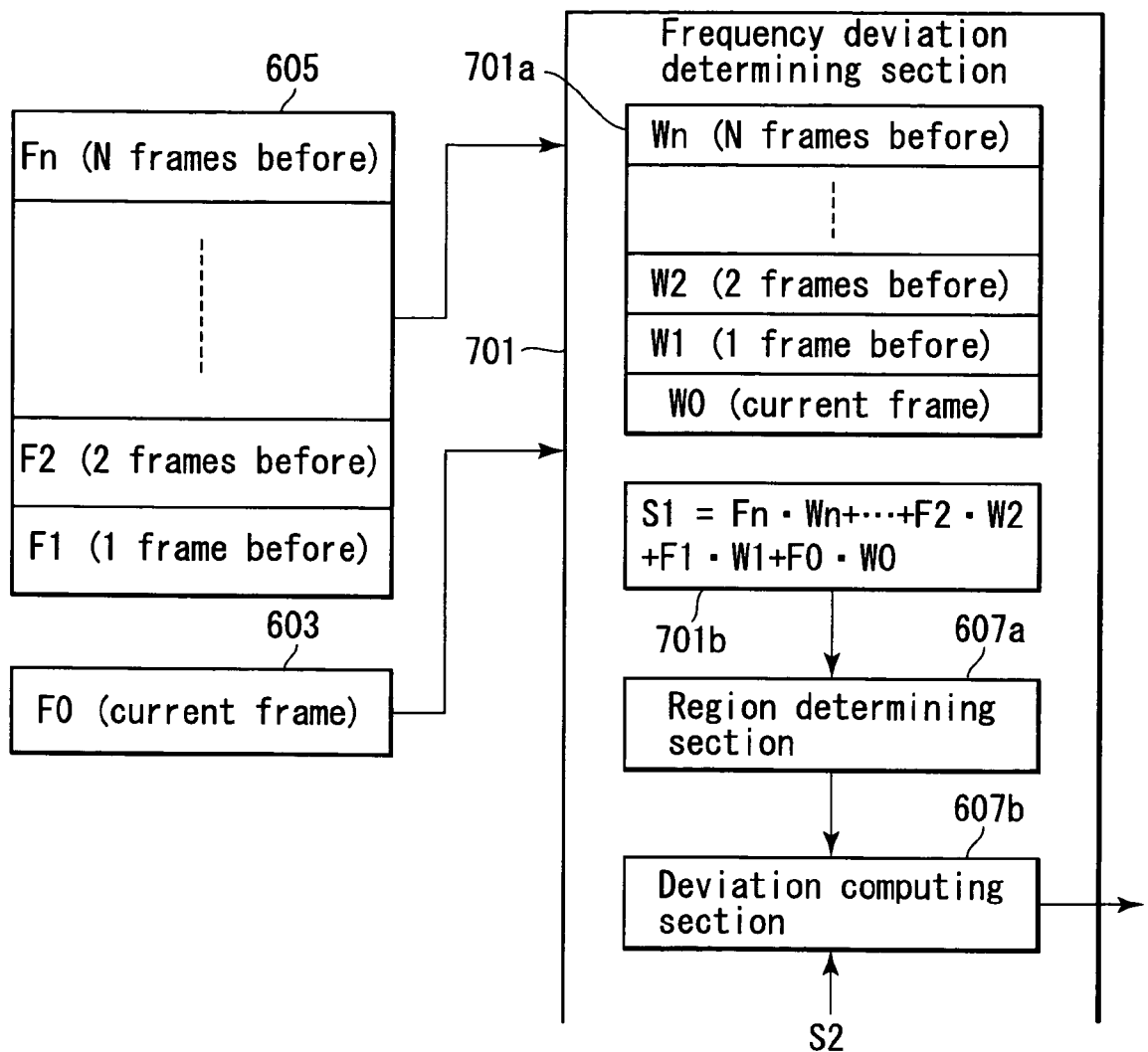
FIG. 11 is a schematic block diagram of part of the embodiment of FIG. 10.

FIG. 11 is a schematic block diagram of the first memory section 605 and the frequency deviation determining section 701, showing the configurations thereof. The frequency deviation determining section 701 typically includes a memory section 701a, a computing section 701b, a region determining section 607a and a deviation computing section 607b. The memory section 701a stores weight information W0, W1, . . . , Wn which correspond to the frequency deviation information respectively for the current frame, 1 frame before, . . . and N frames before. The computing section 701b adds the weight information W0, W1, . . . , Wn respectively to the corresponding frequency deviation information including the frequency deviation information F0 for the current frame as supplied from the first frequency deviation detecting section 603 and the frequency deviation information F1, . . . , Fn for 1 frame before, . . . , and N frames before as supplied from the first memory section 605. In other words, the computing section 701b obtains information S1 on the frequency deviation which is detected by using short cycle time signals by a computation using the equation below.

$$S1=FnWn+ \ldots +F2W2+F1W1+F0W0$$

The region determining section 607a determines the region on the basis of the information S1 obtained in a manner as described above. Additionally, the computing section 701b adds the weight information W0, W1, . . . , Wn respectively to the corresponding frequency deviation information including the frequency deviation information F0 for the current frame as supplied from the second frequency deviation detecting section 604 and the frequency deviation information F1, . . . , Fn for 1 frame before, . . . , and N frames before as supplied from the second memory section 606 in order to obtain information S2 on the frequency deviation which is detected by using long cycle time signals. The computation for obtaining the information S2 may be performed by another computing section that is different from the computing section 701b and dedicated to the operation of obtaining information S2. The deviation computing section 607b computationally determines the frequency deviation of the current frame on the basis of the frequency deviation information S2 and the outcome of determination from the region determining section 607a. The computationally determined deviation is supplied to the frequency adjusting section 608. The frequency adjusting section 608 adjusts the frequency of the received signal according to the deviation supplied to it.

In the fourth embodiment, the frequency deviation information that are detected from a plurality of received signals are stored in the first and second memory sections 605, 606 and the frequency deviation information in the past as stored in the first and second memory sections 605, 606 and the information on the currently detected frequency deviation are synthetically combined. Then, the frequency deviation is determined on the basis of the synthetically combined frequency deviation information. Therefore, the influence of noise can be minimized in this embodiment.

Small weights may be added to the information of the past. Alternatively, the average of the frequency deviations in the past and the current frequency deviation may be computed and the obtained average may be used to determine the frequency deviation in place of using weights. With any of the above arrangement, the influence of noise can be minimized and the accuracy of frequency adjustment can be improved.

Furthermore, the power consumption rate can be reduced by driving the first frequency deviation detecting section 603 and the second frequency deviation detecting section 604 intermittently when the number of frames to be used for synthesis is appropriately selected.

5th Embodiment

Figure 12:
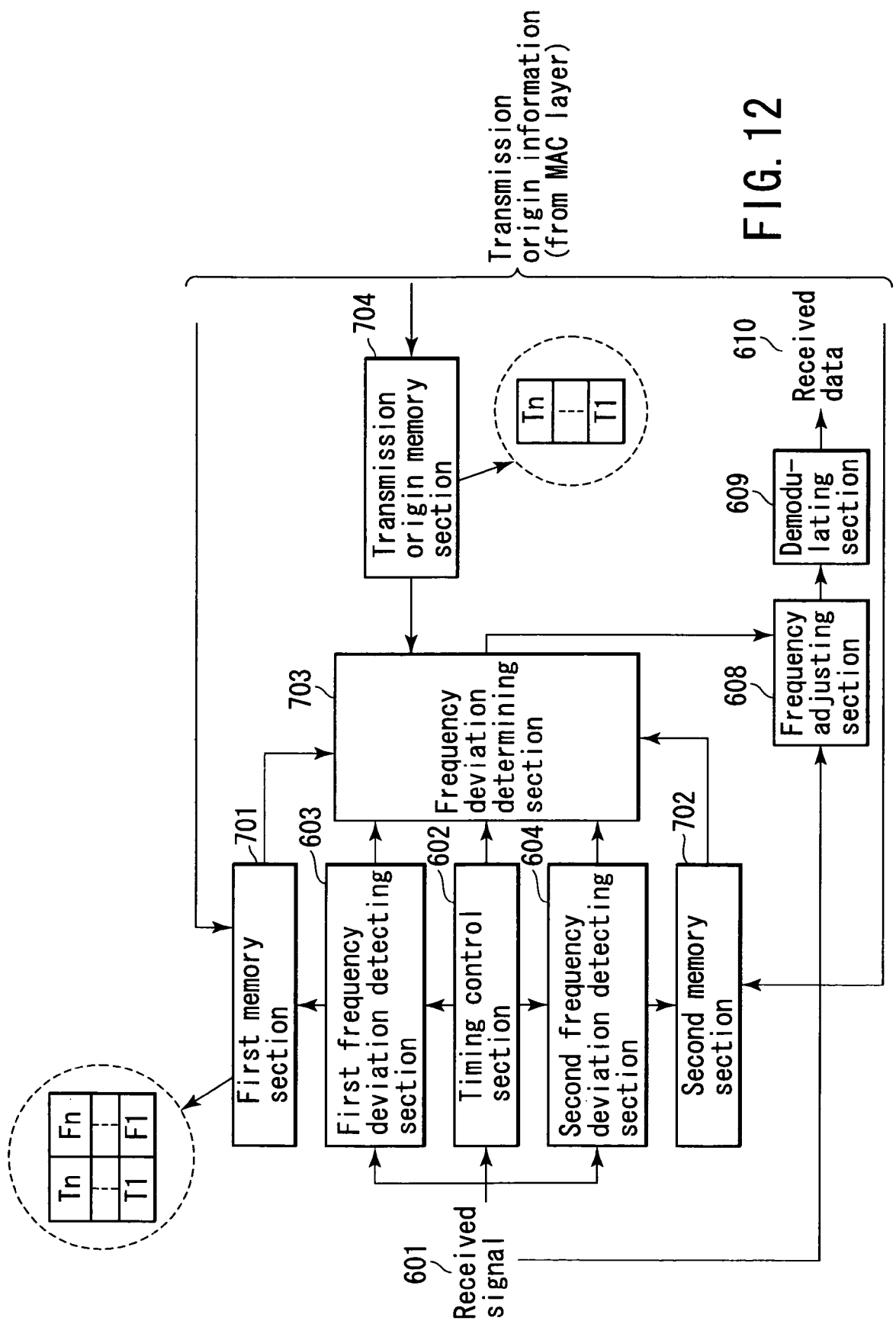
FIG. 12 is a schematic block diagram of an automatic frequency adjustment device which relates to the fifth embodiment of the invention.

FIG. 12 is a schematic block diagram of the fifth embodiment of the invention. The above described fourth embodiment is adapted to adjust the frequency of the currently received signal on the basis of information on the frequency deviations in the past. On the other hand, the fifth embodiment stores information on the frequency deviations in the past of the transmitter, or transmission origin, from which it is currently receiving a signal and adjusts the frequency of the received signal on the basis of the stored information on the frequency deviations in the past. In FIG. 12, the components same as those of FIG. 10 are denoted respectively by the same reference symbols and only the components that differ from FIG. 10 will be described below.

A first memory section 701, a second memory section 702 and a transmission origin memory section 704 are connected to a frequency deviation determining section 703. The first memory section 701 and the second memory section 702 store frequency deviation information of the transmission origin in the past F1, . . . , Fn corresponding to the transmission origin information T1, . . . , Tn. The transmission origin information T1, . . . , Tn are typically supplied from a MAC layer. More specifically, the first memory section 701 stores frequency deviation information that correspond to the short cycle time signals supplied from the first frequency deviation detecting section 603 in correspondence to the transmission origin information. The second memory section 702 stores frequency deviation information that correspond to the long cycle time signals supplied from the second frequency deviation detecting section 604 in correspondence to the transmission origin information. The transmission origin memory section 704 stores the transmission origin information T1, . . . , Tn as supplied from the MAC layer.

As shown in FIG. 11, the frequency deviation determining section 703 includes a computing section 701b, a region determining section 607a and a deviation computing section 607b. The frequency deviation determining section 703 receives frequency deviation information (phase of correlation) which correspond to the short cycle time signals in the past from the same transmission origin stored in the first memory section 701 and frequency deviation information (phases of correlations) which corresponds to the short cycle time signals of the currently received signal as supplied from the first frequency deviation detecting section 603 according to timing signal supplied from the timing control section 602 and the transmission origin information supplied from the transmission origin memory section 704. The computing section 701b determines the synthetically combined value (added value) of the frequency deviation information (phases of correlations) corresponding to the short cycle time signals from the same transmission origin in the past and the frequency deviation information (phase of correlation) corresponding to the short cycle time signals of the currently received signal. The region determining section 607a determines the regions of frequency deviation from the value obtained by the synthesis.

Additionally, the frequency deviation determining section 703 takes in the frequency deviation information (phases of correlations) which correspond to the long cycle time signals in the past from the same transmission origin stored in the second memory section 702 and the information (phase of correlation) which correspond to the long cycle time signals of the currently received signal as supplied from the second frequency deviation detecting section 604 according to the timing signal supplied from the timing control section 602 and the transmission origin information supplied from the transmission origin memory section 704. The computing section 701b determines the synthetically combined value (added value) of the frequency deviation information (phases of correlations) corresponding to the long cycle time signals from the same transmission origin in the past and the frequency deviation information (phase of correlation) corresponding to the long cycle time signals of the currently received signal. The deviation computing section 607b computationally determines the frequency deviation of the received signal from the output signal of the region determining section 607a and the frequency deviation information supplied from the computing section 701b.

The frequency adjusting section 608 adjusts the frequency of the received signal 601 according to the frequency deviation as output from the frequency deviation determining section 703. The demodulating section 609 demodulates the received signal and extracts the received data 610, which are then supplied to the MAC layer. The MAC layer extracts the information indicating the transmission origin from the received data 610 and supplies it to the first and second memory sections 701, 702 and the transmission origin memory section 704.

According to the above-described fifth embodiment, information on the frequency deviations in the past of the transmission origin from which a signal is currently being received is stored and the frequency of the received signal is adjusted on the basis of the stored information on the frequency deviations in the past. Thus, in a situation where the carrier wave frequency of each communication partner deviates, the frequency deviation is determined for each communication partner and the frequency is adjusted to minimize the influence of noise.

In the fifth embodiment, the power consumption can also be reduced by driving the first frequency deviation detecting section 603 and the second frequency deviation detecting section 604 intermittently.

6th Embodiment

FIG. 13 is a schematic block diagram of the sixth embodiment of the invention. The sixth embodiment is adapted to be able to adjust the transmission frequency in addition to the features of the fifth embodiment. In FIG. 13, the components same as those of FIG. 12 are denoted respectively by the same reference symbols and only the components that differ from FIG. 12 will be described below.

Referring to FIG. 13, the frequency deviation output from the frequency deviation determining section 703 is supplied not only to the received signal frequency adjusting section 608 but also to the transmission frequency adjusting section 801 that is typically contained in a wireless LAN transmitter. The transmission frequency adjusting section 801 adjusts the frequency of the transmitted signal according to the frequency deviation as supplied from the frequency deviation determining section 703.

According to the sixth embodiment, the frequency deviation is determined on the basis of transmission origin information and the frequency of the received signal and which of the transmitted signal are adjusted. Thus, the frequency of the transmitted signal can be adjusted according to the carrier wave frequency of the communication partner so that the deviation of the frequency of the signal received from the communication partner can be minimized.

The sixth embodiment can be suitably used for a system where a same frequency is used for both the carrier wave of the transmitter and that of the receiver, although it can also be used for a system where the carrier wave frequency of the transmitter and that of the receiver differ from each other.

It will be appreciated that the first through sixth embodiments are not limited to wireless LANs and can also find a field of application in communication systems which use packets with a short cycle time and communication systems which use packets with a long cycle time.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A frequency adjustment device comprising:
a first detecting section which detects a deviation of a frequency of a first signal contained in a received signal and having a short cycle time;
a second detecting section which detects a deviation of a frequency of a second signal contained in the received signal and having a cycle time longer than that of the first signal;
a determining section which determines a deviation of a frequency of the received signal on the basis of the deviation of the first signal detected by the first detecting section and that of the second signal detected by the second detecting section; and
a frequency adjusting section which adjusts a frequency of the received signal on the basis of the frequency deviation determined by the determining section,
wherein the first detecting section comprising:
a first delay circuit which delays the received signal by a first delay time; and
a first correlation computing section which is supplied with an output signal of the first delay circuit and the received signal, computes a correlation of the signals and outputs the frequency deviation,
wherein the second detecting section comprising:
a second delay circuit which delays the received signal by a second delay time which is longer than the first delay time; and
a second correlation computing section which is supplied with the output signal of the second delay circuit and the received signal, computes a correlation of the signals and outputs the frequency deviation.

2. The device according to claim 1, the determining section comprising:
a judging section which judges a region of phase on the basis of the frequency deviation supplied from the first detecting section; and
a computing section which computes a frequency deviation of the received signal on the basis of the region judged by the judging section and the frequency deviation supplied from the second detecting section.

3. The device according to claim 1, the determining section comprising:
a judging section which judges the region of phase on the basis of the frequency deviation supplied from the first detecting section and outputs the result of the determination; and
a computing section which is supplied with the frequency deviation supplied from the first detecting section, the frequency deviation supplied from the second detecting section and the result of the determination from the judging section and computes the average of the frequency deviation supplied from the first detecting section and the frequency deviation supplied from the second detecting section depending on the result of the determination from the judging section, thereby computing the frequency deviation of the received signal.

4. The device according to claim 1, wherein the received signal is a signal formed by way of a modulation system using OFDM (orthogonal frequency division multiplexing).

5. A frequency adjustment device comprising:
a first detecting section which detects a deviation of a frequency of a first signal contained in a received signal and the received signal delayed by a first delay time corresponding to a short cycle time;
a first memory section which stores a past frequency deviation of the first signal detected by the first detecting section;
a second detecting section which detects a deviation of a frequency of a second signal contained in the received signal and the received signal delayed by a second delay time longer than the first delay time;
a second memory section which stores a past frequency deviation of the second signal detected by the second detecting section;
a determining section which determines a deviation of the frequency of the received signal on the basis of the frequency deviation of the first signal detected by the first detecting section, that of the second signal detected by the second detecting section, the past frequency deviations of the first past signals stored in the first memory section and the past frequency deviations of the second past signals stored in the second memory section; and a first frequency adjusting section which adjusts the frequency of the received signal on the basis of the frequency deviation determined by the determining section.

6. The device according to claim 5, the determining section comprising:
   a third memory section which stores a plurality of weight information for each of the frames including the current frame and the frames of the past;
   a first computing section which computationally determines a first synthesized value of the frequency deviation information weighted by the weight information on the basis of the plurality of the frequency deviation of first signals stored in the first memory section and the weight information stored in the third memory section and a second synthesized value of the frequency deviation information weighted by the weight information on the basis of the plurality of the frequency deviation of second signals stored in the second memory section and the weight information stored in the third memory section;
   a determining section which determines a region of phase according to the first synthesized value of the frequency deviation information supplied from the first computing section and outputs a determination result; and
   a second computing section which computes a frequency deviation of the current frame on the basis of the second synthesized value of the frequency deviation information supplied from the first computing section and the determination result supplied from the determining section.

7. The device according to claim 6, further comprising:
   a fourth memory section which is connected to the determining section and stores a plurality of frequency deviations of the transmission origin supplied from a media access layer.

8. The device according to claim 7, wherein
   the determining section determines a frequency deviation of the received signal on the basis of the plurality of frequency deviations of the transmission origin stored in the fourth memory section, the frequency deviation of the current first signal supplied from the first detecting section, the frequency deviation of the current second signal supplied from the second detecting section, the frequency deviations of the first signals of the past supplied from the first memory section and the frequency deviations of the second signals of the past supplied from the second memory section.

9. The device according to claim 7, further comprising:
   a second frequency adjusting section which is connected to the determining section and adjusts the frequency deviation of a transmitted signal according to the frequency deviation of the received signal determined by the determining section.

* * * * *